United States Patent [19]

Irick, Jr. et al.

[11] 4,136,083

[45] Jan. 23, 1979

[54] PIPERIDINYL HYDROGEN ALKYLENE OR ARYLENE PHOSPHATES AND METAL SALTS THEREOF WHICH COMPOUNDS ARE USEFUL AS ULTRAVIOLET STABILIZERS FOR ORGANIC COMPOSITIONS

[75] Inventors: Gether Irick, Jr.; Richard H. S. Wang, both of Kingsport, Tenn.

[73] Assignee: Eastman Kodak Company, Rochester, N.Y.

[21] Appl. No.: 906,397

[22] Filed: May 16, 1978

[51] Int. Cl.$^2$ .............................................. C08K 5/34
[52] U.S. Cl. .................... 252/400 A; 260/45.75 W; 260/45.75 N; 260/45.75 K; 260/45.75 R; 546/6; 546/188; 546/191
[58] Field of Search ............... 260/45.8 N, 45.75 W, 260/45.75 R, 45.75 N, 45.75 K, 293.9, 293.63, 293.64, 45.7 P

[56] References Cited

U.S. PATENT DOCUMENTS 3,640,928  2/1972  Murayama et al. ............ 260/23 XA
4,046,737  9/1977  Holt et al. ...................... 260/45.8 N

*Primary Examiner*—V. P. Hoke
*Attorney, Agent, or Firm*—Clyde L. Tootle; Daniel B. Reece, III

[57] ABSTRACT

The invention relates to piperidinyl hydrogen alkylene or arylene phosphates which have been found to be effective ultraviolet stabilizers. The invention also relates to piperidinyl hydrogen alkylene or arylene phosphate salts which have been found to be effective ultraviolet stabilizers. The invention also relates to ultraviolet degradable or organic compositions containing a stabilizing amount of the piperidinyl hydrogen alkylene or arylene phosphates or salts thereof to prevent such degradation. These stabilizers are effective in the presence of other additives commonly employed in polymeric compositions including, for example, pigments, colorants, fillers, reinforcing agents and the like. These ultraviolet stabilizers may also be incorporated into the organic compositions in the polymer melt or dissolved in the polymer dope, or coated on the exterior of the molded article, film or extruded fiber.

18 Claims, No Drawings

PIPERIDINYL HYDROGEN ALKYLENE OR ARYLENE PHOSPHATES AND METAL SALTS THEREOF WHICH COMPOUNDS ARE USEFUL AS ULTRAVIOLET STABILIZERS FOR ORGANIC COMPOSITIONS

This invention relates to piperidinyl hydrogen alkylene or arylene phosphates or salts thereof useful as ultraviolet stabilizers and their use in organic compositions. More particularly, the invention relates to piperidinyl hydrogen alkylene or arylene phosphates or salts thereof and the stabilization of ultraviolet degradable organic compositions against deterioration resulting from the exposure to such radiations with such piperidinyl phosphates or salts thereof.

The degradative effects of ultraviolet light on various organic compositions is well known in the art. The photodeterioration or degradation is of particular concern with organic photo-degradable compositions which are exposed to ultraviolet light, such as sunlight, for long periods of time. One group of such photodegradable organic compositions are polymeric compositions such as polyolefins, polyesters, polyurethanes and the like. On exposure to sunlight for extended periods of time, these polymeric compositions degrade and their physical properties are reduced thereby rendering such polymeric compositions less useful or useless for most applications. Therefore, considerable effort has been directed to providing a solution to the photodegradation problem of polymeric compositions. As a result of this effort, there have been discovered many additives and stabilizers which improve the stability of polymeric compositions.

While there are many additives, stabilizers and mixtures thereof which are known in the art to improve the ultraviolet light stability of organic compositions, there is a need in the art for more efficient and effective stabilizers to prevent the photo-degradation of organic compositions susceptible to photo-degradation. Therefore, to provide a more effective and efficient ultraviolet stabilizer for organic compositions susceptible to such degradation would be an advance in the state of the art.

It is, therefore, an object of the present invention to provide more effective and efficient ultraviolet light stabilizer compositions.

Another object of the present invention is to provide useful compositions characterized by improved resistance to ultraviolet degradation and deterioration.

It is still another object of the present invention to provide compositions containing piperidinyl hydrogen alkylene or arylene phosphate compositions which are resistant to ultraviolet degradation.

It is a still further object of this invention to provide processes for improving the resistance of organic materials to deterioration and degradation by actinic radiation and especially ultraviolet radiation.

It is a still further object of this invention to provide compositions and processes for improving the resistance of organic materials to deterioration and degradation by ultraviolet radiations, including short wavelength visible radiations.

Further objects and advantages of the invention will be apparent to those skilled in the art from the accompanying disclosure and claims.

In accordance with the present invention, piperidinyl hydrogen alkylene or arylene phosphate compositions are provided which are useful as ultraviolet stabilizers. The organic compositions contain at least two piperidinyl group containing compositions connected through an alkylene or arylene dihydrogen phosphate moiety. The piperidinyl hydrogen alkylene or arylene phosphate compositions of the present invention have the following structures:

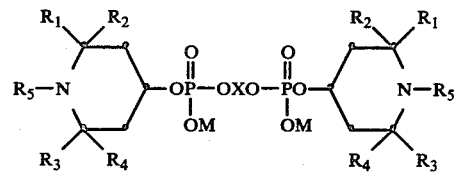

$R_1$ and $R_2$ are each alkyl having 1-6 carbons; $R_3$ and $R_4$ are each alkyl having 1-6 carbons or together with the carbon to which they are bound form a cyclopentyl or cyclohexyl ring, which is unsubstituted or substituted with a methyl group; and $R_5$ is hydrogen, oxy, alkyl having 1 to 12 carbon atoms, $\beta$-methoxyethyl, alkenyl having 3 or 4 carbon atoms, propargyl, benzyl or alkyl substituted benzyl; and M is either hydrogen or a metal ion selected from the group consisting of Li, Na, K, Mg, Ca, Ba, Mn, Co, Ni, Sn, Zn, Ce, and the amount of hydrogen for M can vary from zero to 100%. Preferably, the amount of M is from 67 to 100 mole percent hydrogen. Since the valence of M for these metals is not always one, it is understood that the valency requirements of M may be filled by a suitable anion such as acetoxy, benzoyloxy, chloro and the like. X is an alkylene having 2 to 12 carbon atoms or an arylene with 6, 12 or 18 carbon atoms.

Suitable piperidinyl groups are 2,2,6,6-tetramethylpiperidin-4-yl, 1,2,2,6,6-pentamethylpiperidin-4-yl, 1-oxo-2,2,6,6-tetramethylpiperidin-4-yl and the like.

The piperidinyl hydrogen alkylene or arylene phosphate was prepared by reacting phosphorus oxychloride with a dihydroxy compound to form bis(phosphorodichloridate), which was subsequently reacted with sodium salt of 2,2,6,6-tetramethyl-4-piperidinol to produce bis(2,2,6,6-tetramethyl-4-piperidinyl hydrogen phosphate).

The mixed piperidinyl hydrogen alkylene or arylene phospates are prepared by reacting about 1 mole of piperidinyl alcohol with about half a mole phosphorus pentoxide. The reaction can be carried out in a suitable solvent such as p-dioxane and chlorobenzene. The product obtained is then reacted with a dihydroxy compound such as ethylene glycol on an equal molar ratio. Other dihydroxy compounds can be used in place of ethylene glycol, such as propylene glycol, diethylene glycol, 1,4-butanediol, 1,6-hexanediol, 1,4-cyclohexanedimethanol, neopentyl glycol, resorcinol, hydroquinone, catechol, and the like. The product is then reacted with an additional molar amount of phosphorus pentoxide. After the second phosphorus pentoxide reaction is completed, an additional 2 molar amount of piperidinyl alcohol is added, which alcohol can be the same initially used or a different piperidinyl alcohol. Each step of the reaction can be carried out at a temperature of about 80° C. for a period of about 4 hours. The reaction can be carried out in batch reaction in one reactor.

The piperidinyl hydrogen alkylene or arylene phosphate compositions can be added to organic compositions which are susceptible to ultraviolet degradation. Such compositions include, for example, polymeric compositions such as polyolefins such as, for example, high, medium and low density polyethylene, polypropylene, polybutene and the like; polyamides such as N-methoxymethyl polyhexamethylene adipamide and the like; polycarbonates; polyvinyl chlorides and copolymers; cellulose esters; acrylic/butadiene/styrene plastic; polyacrylics such as methyl methacrylate; polystyrene; gelatin; vinylidene chloride copolymers such as vinylidene chloride/vinyl actate copolymers; ethylene vinyl acetate copolymers; cellulose ethers such as methyl cellulose; polyvinyl esters such as polyvinyl acetate; polyethylene oxide; polyvinyl acetals; polyformaldehydes; and polyurethanes. Such compositions also include natural and synthetic rubbers, such as polybutadiene, and unsaturated organic compositions such as oils and the like, as well as compositions containing such organic compositions.

The piperidinyl hydrogen alkylene or arylene phosphate compositions, as effective ultraviolet stabilizers, are generally used in an amount of from 0.01% to 10%, by weight, based on the weight of the organic material to which they are added. While a detectable amount of ultraviolet stabilization may be obtained with amounts less than 0.01%, this amount of stabilization would be of little practical utility in a commercial application. Moreover, while amounts greater than 10%, by weight, provide effective ultraviolet stability, such concentrations are undesirable because of cost and the deleterious effect which such concentrations may have on the mechanical properties of the organic composition in which the stabilizer is incorporated. Preferably, the stabilizer is used in an amount of from about 0.1 to about 3%, by weight. For example, an amount of 0.5% by weight, of the stabilizer effectively stabilizes $TiO_2$-pigmented polypropylene plastic compositions.

The ultraviolet stabilized organic compositions of the present invention may also contain other additives, pigments, colorants, stabilizers and the like. For example, polymeric compositions, such as polyolefins, may also contain and generally do contain other additives such as white or colored pigments or colorants, antioxidants, plasticizers, flow aids, processing aids, polymeric modifiers and the like.

These novel piperidinyl hydrogen alkylene or arylene phosphate ultraviolet stabilizers may be incorporated into organic compositions by melt-blending, by dissolving in a common solvent, by emulsification, or may be added onto the surface of an organic plastic material prior to being molded into a suitable object. These materials can also be added to coatings and the like which can be applied to the surface of a molded object. One of the novel features of the present piperidinyl hydrogen alkylene or arylene phosphate ultraviolet stabilizers is that the pH of the compositions is controllable. For example, the preparation of a salt or partial salt of the compositions changes the pH of the compositions. This can be important, for example, with an emulsifiable polymer that requires a base medium. The addition of an acid stabilizer could break up the emulsion and be detrimental. Therefore, the acidity of the stabilizer can be changed by formation of a salt. Also, the solubility of the compositions in organic solvents and aqueous mediums can be modified by converting the acid to a salt, for example.

This invention will be further illustrated by the following examples although it will be understood that these examples are included merely for purposes of illustration and are not intended to limit the scope of the invention.

EXAMPLE 1

Preparation of 1,4-phenylene bis(2,2,6,6-tetramethyl-4-piperidinyl hydrogen phosphate), I. A mixture of hydroquinone (11 g., 0.10 mole), phosphorus oxychloride (45.9 g., 0.3 mole) and potassium chloride (1.0 g.) was refluxed for 4 hours. After removal of excess phosphorus oxychloride in vacuo, the product A, 1,4-phenylene bis(phosphorodichloridate), was crystallized from toluene.

To a solution of A (34.4 g., 0.10 mole) in 100 ml. of hot toluene, the sodium salt of 2,2,6,6-tetramethyl-4-piperidinol (35.8 g., 0.20 mole) in 100 ml. of toluene was added slowly. The mixture was heated at 80° C. for 4 hours. After standing at room temperature overnight, 100 ml. of water was added to the mixture. Subsequently the solvent was removed in vacuo, the residue was dissolved in 200 ml. of hot ethanol, and the product I was obtained after removal of ethanol (49 g., 89%).

EXAMPLE 2

Preparation of mixed mono- and 1,2-ethylene bis(2,2,6,6-tetramethyl-4-piperidinyl hydrogen phosphate), II. The preparation of II was made as follows:

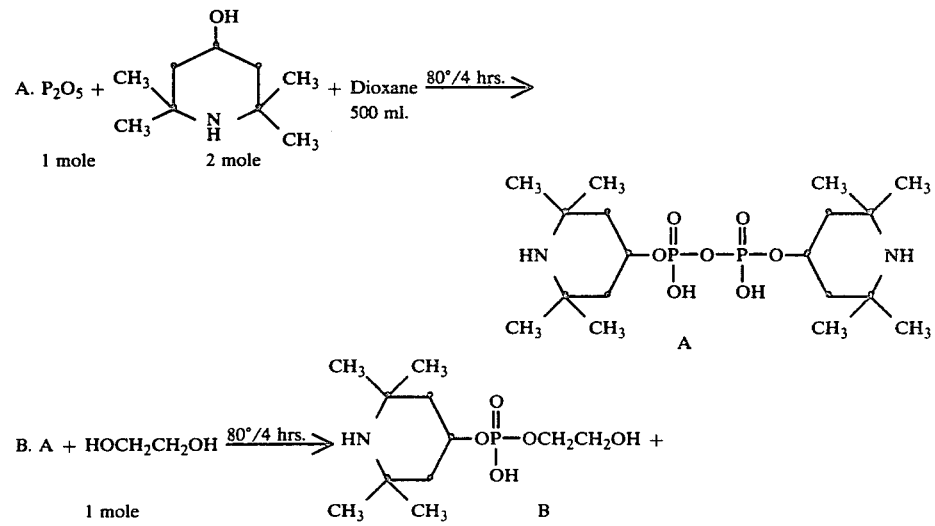

-continued

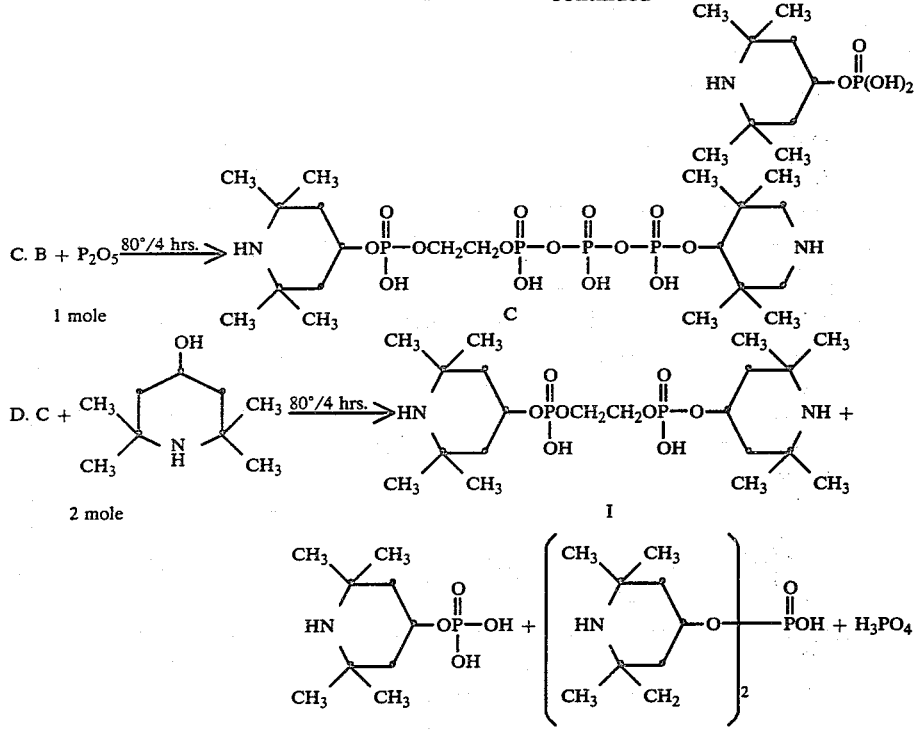

EXAMPLE 3

Preparation of mixed mono- and 1,6-hexamethylene-bis-(2,2,6,6-tetramethyl-4-piperidinyl hydrogen phosphate) III. The preparation of III was by the reaction of phosphorus pentoxide, 2,2,6,6-tetramethyl-4-piperidinol and 1,6-hexanediol in the same manner as described in Example 2 for II.

EXAMPLE 4

Preparation of mixed mono- and 1,3-phenylene-bis(2,2,6,6-tetramethyl-4-piperidinyl hydrogen phosphate), IV. The preparation of IV was by the reaction of phosphorus pentoxide, 2,2,6,6-tetramethyl-4-piperidinol and resorcinol in the same manner as described in Example 2 for II.

EXAMPLE 5

Preparation of mixed II and its zinc salt, (V). A mixture of II (9.74 g.) and zinc acetate (1.83 g.) was refluxed in 100 ml. of dichloromethane for 4 hours. The product V was obtained after removing solvent by evaporation.

EXAMPLE 6

Preparation of mixed II and its cerous salt (VI). The product VI was prepared by the reaction of II (9.74 g) and cerous acetate (2.12 g) in the same manner as described in Example 5 for product V.

EXAMPLE 7

Preparation of mixed II and its nickel salt (VII). The product VII was made by the reaction of II (9.74 g) and nickelous acetate (1.77 g) in the same manner as described in Example 5 for product V.

EXAMPLE 8

Preparation of mixed II and its potassium salt (VIII). A solution of 20 g. of I in 300 ml. methanol was stirred at 25° C. during the addition of 19% aqueous potassium hydroxide to pH 7.5. After stirring overnight, solvent was removed by evaporation to yield the product VIII as a light yellow solid.

EXAMPLE 9

Preparation of mixed III and its zinc salt, (IX). The product IX was prepared by the reaction of III (10.30 g) and zinc acetate (1.83 g) in the same manner as described in Example 5 for product V.

EXAMPLE 10

Preparation of mixed IV and its zinc salt, X. The product X was prepared by the reaction of IV (10.22 g) and zinc acetate (1.83 g) in the same manner as described in Example 5 for product V.

EXAMPLE 11

The ultraviolet stabilization provided by the piperidinyl phosphates of the present invention is shown in $TiO_2$-pigmented polypropylene in Table 1.

Table 1

| Effectiveness of Ultraviolet Stabilizers in $TiO_2$-Pigmented Polypropylene Film Exposed In Uvatest Weathering Device | |
|---|---|
| Compound (0.5%) | Time to Embrittlement (Hours) |
| none | 300 |
| I | 3200 |
| II | 3200 |
| III | 3400 |
| IV | 3300 |
| V | 3500 |
| VI | 3300 |
| VII | 2900 |
| VIII | 3200 |
| IX | 3300 |
| X | 3100 |
| II + 0.5% Tinuvin 328[1] | 3800 |
| V + 0.5% Tinuvin 328 | 3600 |

Table 1-continued
Effectiveness of Ultraviolet Stabilizers in
TiO₂-Pigmented Polypropylene Film Exposed
In Uvatest Weathering Device

| Compound (0.5%) | Time to Embrittlement (Hours) |
| --- | --- |
| II + 0.5% Ferro AM-340[2] | 4000 |

[1]2-(2H-benzotriazol-2-yl)-4,6-di-t-pentylphenol.
[2]2,4-di-t-butylphenyl 3,5-di-t-butyl-4-hydroxybenzoate.

Table 2
Effectiveness of ultraviolet Stabilizers in
Polyurethane Coating on Steel Panels After
QUV Cyclic Environmental Tester Exposure

| Compound (1%) | % Gloss Retained After 500 Hrs. Exposure |
| --- | --- |
| None | 12 |
| I | 80 |
| II | 75 |
| III | 82 |
| IV | 80 |
| V | 84 |
| VI | 79 |
| VII | 65 |
| VIII | 80 |
| IX | 79 |
| X | 78 |
| II + 1% Tinuvin 328 | 88 |
| II + 1% Ferro AM-340 | 82 |
| V + 1% Tinuvin 328 | 90 |

These piperidinyl hydrogen ethylene or arylene phoshate compositions find particular utility as ultraviolet stabilizers in organic compositions requiring ultraviolet stability. Such compositions include polymeric compositions such as, for example, polyurethanes, poly-α-olefins, polyamides, acrylics, cellulose esters and the like as well as molded or shaped articles, film, and coatings formed from such materials and the like. Such compositions also include natural and synthetic rubbers, such as natural rubber, as well as organic materials such as oils, fats, and unsaturated organic materials and materials having such materials contained therein such as paints, varnishes, cosmetics and the like.

The invention has been described in detail with particular reference to preferred embodiments thereof, but it will be understood that variations and modifications can be effected within the spirit and scope of the invention.

We claim:

1. An organic composition susceptible to ultraviolet light degradation stabilized against such degradation with a stabilizing amount of piperidinyl phosphate having the formula:

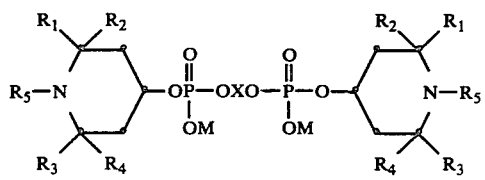

$R_1$ and $R_2$ are each alkyl having 1–6 carbons; $R_3$ and $R_4$ are each alkyl having 1–6 carbons or together with the carbon to which they are bound form a cyclopentyl or cyclohexyl ring, which is unsubstituted or substituted with a methyl group; and $R_5$ is hydrogen, oxy, alkyl having 1 to 12 carbon atoms, β-methoxyethyl, alkenyl having 3 or 4 carbon atoms, propargyl, benzyl or alkyl substituted benzyl, and M is either hydrogen or a metal ion selected from the group consisting of Li, Na, K, Mg, Ca, Ba, Mn, Co, Ni, Sn, Zn, Ce, and the amount of hydrogen for M can vary from zero to 100% and X is an alkylene having 2 to 12 carbon atoms or an arylene with 6, 12 or 18 carbon atoms.

2. An organic composition according to claim 1 wherein said piperidinyl phosphate has the formula:

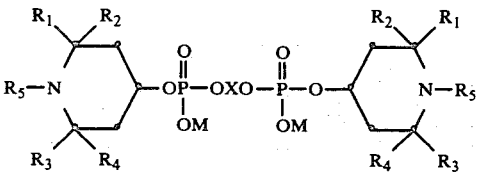

$R_1$ and $R_2$ are each alkyl having 1–6 carbons; $R_3$ and $R_4$ are each alkyl having 1–6 carbons or together with the carbon to which they are bound form a cyclopentyl or cyclohexyl ring, which is unsubstituted or substituted with a methyl group; and $R_5$ is hydrogen, oxy, alkyl having 1 to 12 carbon atoms, β-methoxyethyl, alkenyl having 3 or 4 carbon atoms, propargyl, benzyl or alkyl substituted benzyl and X is an alkylene having 2 to 12 carbon atoms or an arylene with 6, 12 or 18 carbon atoms.

3. An organic composition according to claim 2 wherein said piperidinyl phosphates have the formula:

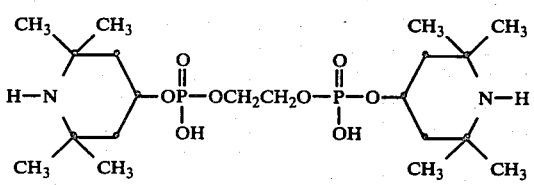

4. An organic composition according to claim 2 wherein said piperidinyl phosphate has the formula:

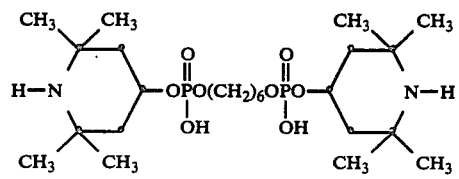

5. An organic composition according to claim 2 wherein said piperidinyl phosphate has the formula:

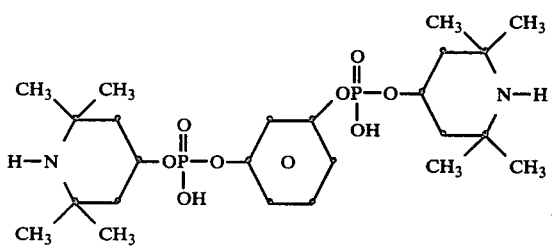

6. An organic composition according to claim 2 wherein said piperidinyl phosphate has the formula:

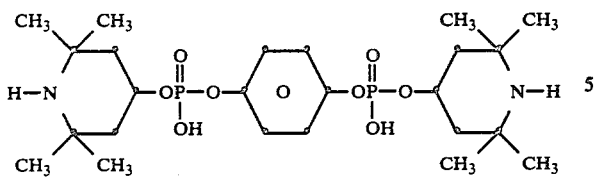

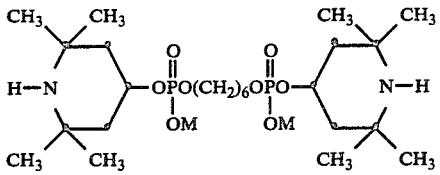

7. An organic composition according to claim 1 wherein said piperidinyl phosphate has the formula:

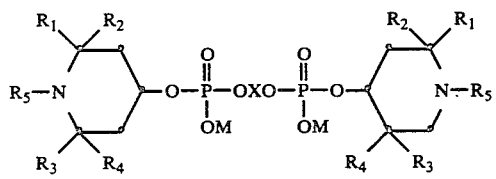

$R_1$ and $R_2$ are each alkyl having 1-6 carbons; $R_3$ and $R_4$ are each alkyl having 1-6 carbons or together with the carbon to which they are bound form a cyclopentyl or cyclohexyl ring, which is unsubstituted or substituted with a methyl group; and $R_5$ is hydrogen, oxy, alkyl having 1 to 12 carbon atoms, β-methoxyethyl, alkenyl having 3 or 4 carbon atoms, propargyl, benzyl or alkyl substituted benzyl, and M is a metal ion selected from the group consisting of Li, Na, K, Mg, Ca, Ba, Mn, Co, Ni, Sn, Zn, Ce, and the amount of hydrogen for M can vary from zero to 100% and X is an alkylene having 2 to 12 carbon atoms or an arylene with 6, 12 or 18 carbon atoms.

8. An organic composition according to claim 7 wherein said piperidinyl phosphate has the formula:

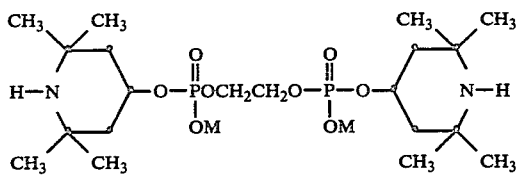

wherein M is a metal ion selected from the group consisting of Li, Na, K, Mg, Ca, Ba, Mn, Co, Ni, Sn, Zn and Ce.

9. An organic composition according to claim 7 wherein said piperidinyl phosphate has the formula:

wherein M is a metal ion selected from the group consisting of Li, Na, K, Mg, Ca, Ba, Mn, Co, Ni, Sn, Zn and Ce.

10. An organic composition according to claim 7 wherein said piperidinyl phosphate has the formula:

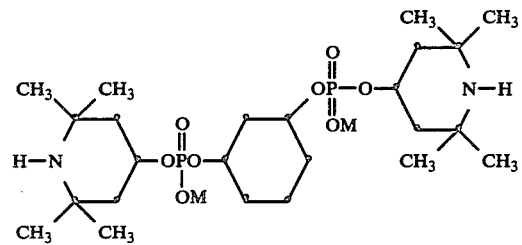

wherein M is a metal ion selected from the group consisting of Li, Na, K, Mg, Ca, Ba, Mn, Co, Ni, Sn, Zn and Ce.

11. An organic composition according to claim 7 wherein said piperidinyl phosphate has the formula:

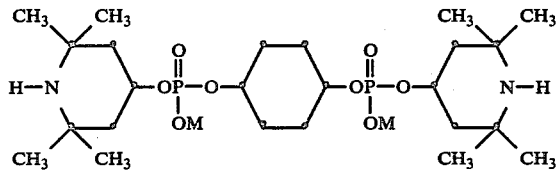

12. An organic composition according to claim 8 wherein said metal ion is potassium.

13. An organic composition according to claim 8 wherein said metal ion is nickel.

14. An organic composition according to claim 8 wherein said metal ion is cerium.

15. An organic composition according to claim 8 wherein said metal ion is zinc.

16. An organic composition according to claim 9 wherein said metal ion is zinc.

17. An organic composition according to claim 10 wherein said metal ion is zinc.

18. An organic composition according to claim 11 wherein said metal ion is zinc.

* * * * *

UNITED STATES PATENT AND TRADEMARK OFFICE
CERTIFICATE OF CORRECTION

PATENT NO. : 4,136,083

DATED : January 23, 1979

INVENTOR(S) : Gether Irick, Jr. et al

It is certified that error appears in the above—identified patent and that said Letters Patent are hereby corrected as shown below:

Claim 2, the structural formula should read

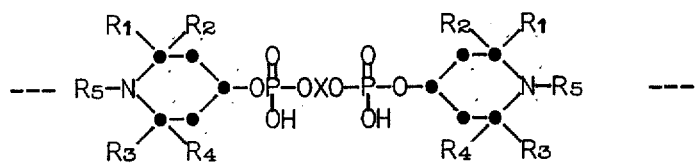

Claim 10, the structural formula should read

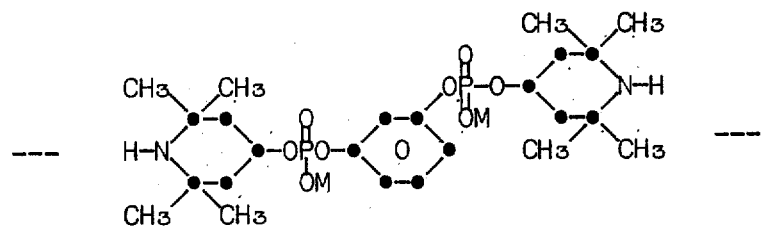

UNITED STATES PATENT AND TRADEMARK OFFICE
CERTIFICATE OF CORRECTION

PATENT NO. : 4,136,083

DATED : January 23, 1979

INVENTOR(S) : Gether Irick, Jr. et al

It is certified that error appears in the above-identified patent and that said Letters Patent are hereby corrected as shown below:

Claim 11, the structural formula should read

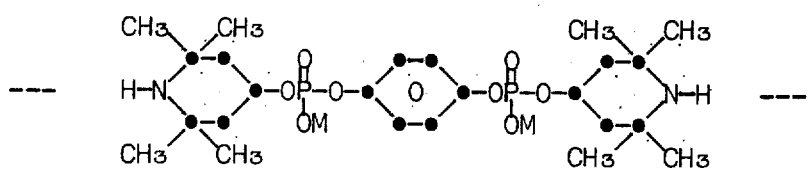

[SEAL]

Signed and Sealed this

Twenty-fourth Day of April 1979

Attest:

RUTH C. MASON
Attesting Officer

DONALD W. BANNER
Commissioner of Patents and Trademarks